United States Patent [19]

Oguchi et al.

[11] Patent Number: 4,546,443

[45] Date of Patent: Oct. 8, 1985

[54] OPERATION CONTROL APPARATUS FOR INDUSTRIAL ROBOT

[75] Inventors: Yukio Oguchi; Kazuyoshi Yasukawa, both of Nagano, Japan

[73] Assignee: Kabushiki Kaisha Sankyo Seiki Seisakusho, Nagano, Japan

[21] Appl. No.: 428,508

[22] Filed: Sep. 29, 1982

[30] Foreign Application Priority Data

Sep. 30, 1981 [JP] Japan .................. 56-156625

[51] Int. Cl.$^4$ ................. G05B 19/18; G06F 15/46
[52] U.S. Cl. ........................ 364/513; 318/568; 901/20; 364/148
[58] Field of Search ............ 364/513, 191, 192, 193; 318/568, 567; 901/2, 9, 20

[56] References Cited

U.S. PATENT DOCUMENTS

| 4,105,937 | 8/1978 | Tuda et al. | 318/568 |
| 4,229,136 | 10/1980 | Panissidi | 901/9 |
| 4,348,731 | 9/1982 | Kogawa | 901/20 |

FOREIGN PATENT DOCUMENTS

| 0510239 | 6/1976 | U.S.S.R. | 901/20 |

Primary Examiner—Jerry Smith
Assistant Examiner—Louis Woo
Attorney, Agent, or Firm—Sughrue, Mion, Zinn, Macpeak, and Seas

[57] ABSTRACT

An operation control apparatus for industrial robot in which a speed pattern optimum for the particular task to be performed is utilized. The operational control apparatus includes a plurality of operating program memories for storing completed operating programs compiled by a separate programming device, a speed pattern memory for storing plural speed patterns, a changeover signal generator which generates a changeover signal in response to a predetermined sensed operating parameter of the industrial robot or in response to operation of manual changeover switch, and a changeover circuit for selecting an optimum speed pattern in response to the changeover signal. Rising and falling slopes of the speed patterns can be made different from one another so that the arm of the industrial robot can be moved at a greater speed when it is not in contact with a workpiece than when it is actively manipulating a workpiece.

5 Claims, 2 Drawing Figures

OPERATION CONTROL APPARATUS FOR INDUSTRIAL ROBOT

BACKGROUND OF THE INVENTION

The present invention relates to an operation control apparatus for selectively setting optimum speed characteristics for movements of an industrial robot.

Industrial robots such as assembly robots are capable of performing tasks such as gripping workpieces and supplying the workpieces one by one to a specified location for assembly into completed products. The speed of movement of the assembly robot while in motion is generally set at a fixed maximum. However, in the case where the maximum permissible speed for a task is lower than the fixed maximum, the operating program must be corrected or changed as otherwise the workpiece could be damaged or the work efficiency lowered. Such a program correction or change is one of the factors responsible for less than totally effective utilization of prior art industrial robots.

It is thus an object of the present invention to provide an industrial robot with a capability of selectively changing the speed characteristics of the robot while in motion for providing a maximum work efficiency of the industrial robot at all times.

SUMMARY OF THE INVENTION

According to the present invention, the above object is achieved by an apparatus for storing a plurality of desired speed patterns independently of operating programs, and manually or automatically selecting and reading out one of such speed patterns in response to a changeover signal. The changeover signal can be generated with a workpiece sensor, particularly, a weight sensor, or otherwise produced using a manual switch.

DESCRIPTION OF THE PREFERRED EMBODIMENTS

The present invention will now be described with reference to the drawings which illustrate a preferred embodiment of the invention.

Figure 1:
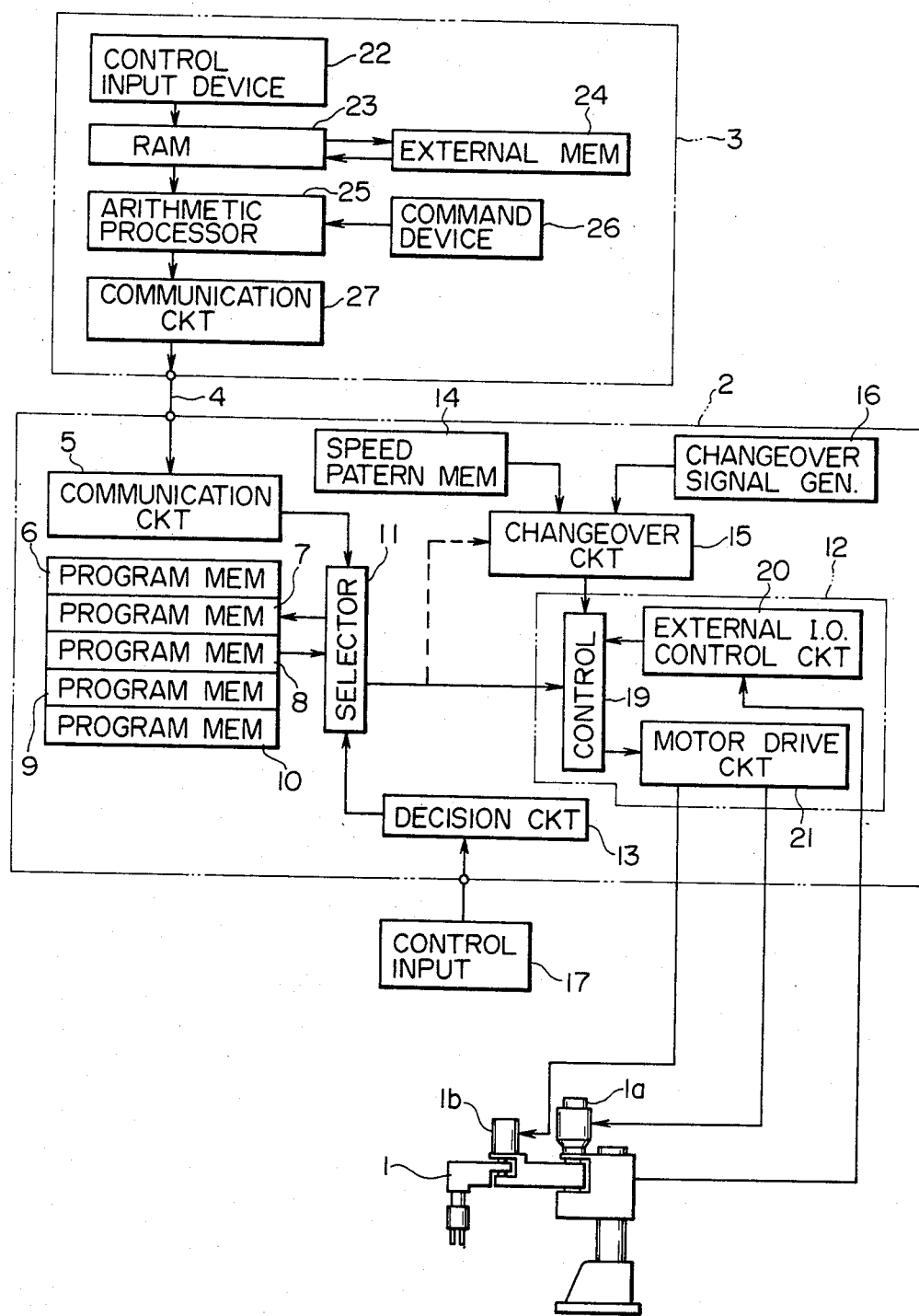
FIG. 1 is a block diagram of an operation control apparatus for an industrial robot constructed according to the present invention.

FIG. 1 shows the overall arrangement of a control system for an industrial robot of the multiple-articulation type. The control system includes an operation control unit 2 and a programming unit 3. The operation control unit 2 and the programming unit 3 are interconnected by a detachable communication cable 4.

Figure 2:
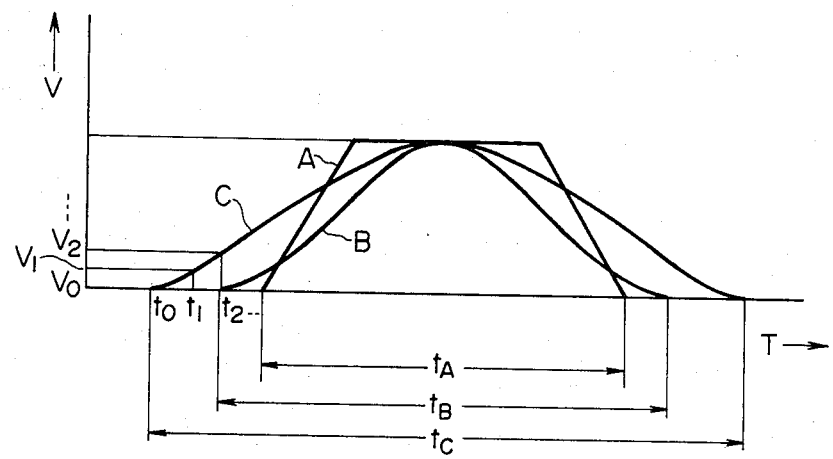
FIG. 2 is a graph of speed patterns used in the apparatus of FIG. 1.

The operation control unit 2 serves to control the operation of an industrial robot 1 of the polar-coordinate type. That is, an industrial robot which operates in response to data supplied in polar-coordinates. The operation control unit 2 is composed of a communication circuit 5 for receiving processed operating programs transferred from the programming unit 3, a plurality of operating program memories 6, 7, ... 10 (five memories in the illustrated embodiment) for storing a plurality of processed operating programs delivered from the communication circuit 5, a selector circuit 11 for switching data bases to select writing or reading of the operating programs, a robot drive control unit 12 which supplies the signals which directly control the industrial robot 1 to carry out the required motions, a decision circuit 13 for setting the selector circuit 11 for a desired operating mode, a speed pattern memory 14 for storing in a ROM a plurality of different speed patterns, for example, three speed patterns A, B, C as shown in FIG. 2, a changeover circuit 15 for selective switching between reading operations for the speed patterns A, B, C, and a changeover signal generator 16 for supplying changeover signals to the changeover circuit 15.

Each of the operating program memories 6, 7, ... 10 is implemented with a RAM and an auxiliary power supply or battery which automatically is connected to the RAM upon failure of the commercial power source so that the stored content of the RAM will be protected at all times against accidental erasure. The selector circuit 11 can manually be controlled by a control input device 17 and the decision circuit 13 for mode settings. The robot drive control unit 12 has a control circuit 19, an external input and output control circuit 20 and a motor drive circuit 21.

When the operator selects a continuous operation mode using the control input device 17, the control circuit 19 enables the selector circuit 11 to deliver the stored content read out of one of the operating program memories 6, 7, ... 10, that is, the selected processed operating program, to the motor drive circuit 21. The external input and output control circuit 20 is responsive to motions of the industrial robot 1 by detecting its operations and positions with limit switches, encoders and the like and delivering data thereof to the control circuit 19. The motor drive circuit 21 receives signals from the external input and output control circuit 20 based on the content of the read-out selected operating program, confirms such signals successively, and in response thereto, sends command signals to pulse motors 1a, 1b of the industrial robot 1 to cause the robot to carry out the designated motions. The changeover signal generator 16 supplies a changeover signal to the changeover circuit 15 for selecting an appropriate one of the speed patterns A, B, C from the speed pattern memory 14. The changeover signal generator 16 can be implemented with a manual changeover switch or a workpiece weight sensor. The workpiece weight sensor automatically measures the weight of a workpiece as delivered and generates an analog or digital changeover signal indicative of a measured weight range.

The programming unit 3 stores a number of desired operating programs and delivers a requested one of the stored operating programs to the operation control unit 2. The programming unit 3 is composed of a control input device 22 such as a keyboard for inputting program data, mode data and other inputs; a RAM memory 23 for temporarily storing input data; an external memory 24 such as a magnetic tape or a magnetic disk having a large storage capacity for storing a multiplicity of operating programs; and an arithmetic processor 25 in the form of a CPU including a control unit and an arithmetic unit and a register for storing processing programs (which include editing programs, coordinate transformation formulas, offset processing programs, and a machine language compiling program), editing the operating programs based on input data from the memory 24, and performing operations such as coordinate transformation and conversion to machine language. The programming unit 3 also has an offset command device 26 for supplying the arithmetic processor 25 with offset or positional correction command signals and a communication circuit 27 for delivering a processed, completed operating program from the arithmetic processor 25 to the operation control unit 2.

Operation of the control system thus constructed will now be described. The programmer operates the control input device 22 to supply input data such as operating positions (in Cartesian coordinates and an angular displacement for a chuck) and external input conditions according to a predetermined preparation procedure based on a PTP (Point-To-Point) system, for example. The input data is temporarily stored in the memory 23 and then stored in its completed form in the external memory 24 at specified addresses.

When the programming unit 3 is to deliver an operating program stored in the external memory 24 to the operation control unit 2, the programming unit 3 and the operation control unit 2 are interconnected as an on-line system by the communication cable 4, and thereafter a required operating program is read from the external memory 24 into the memory 23 using a program transfer input operation. Then, the arithmetic processor 25 operates to convert the content of the memory 23 into polar-coordinates and then into machine language using prestored arithmetic instructions. The data expressed in machine language is fed through the communication circuit 27 and the communication cable 4 to the communication circuit 5 in the operation control unit 2. At this time, the operation control unit 2 is set in an operating program storing mode by the mode setting control input device 17, with the selector circuit 11 operated to designate storage addresses in preparation for data storage. The processed operating program is stored through selector circuit 11 into the first operating program memory 6, for example. In this manner, the operation control unit 2 stores five processed operating programs. Subsequently, the programming unit 3 is severed as an off-line system from the operation control unit 2 by disconnecting the communication cable 4, whereupon the operation control unit 2 can operate independently of the programming unit 3. The operator then controls the control input device 17 to enable the selector circuit 11 to read a desired operating program out of the program memory 6, for example. When a continuous operation mode is selected, the control circuit 19 reads the designated operating program and enables the motor drive circuit 21 to energize the pulse motors 1a, 1b for driving an arm of the industrial robot 1. At the same time, the control circuit 19 receives signals from the external input and output control circuit 20 indicative of the motions of the industrial robot 1 for operating the industrial robot 1 under the control of the selected operating program.

When the changeover signal generator 16 delivers a particular changeover signal to the changeover circuit 15, the latter selects one of the speed patterns A, B, C (for example, the speed pattern C) through the control circuit 19. The control circuit 19 divides a time period required for the arm of the industrial robot 1 to travel a particular distance into stroke times $t_c$, successively reads speed values $v_0, v_1, v_2, \ldots$ on the speed axis V (FIG. 2) at respective times $t_0, t_1, t_2, \ldots$ on the time axis T, and delivers control signals proportional to such speed values to the motor drive circuit 21. The motor drive circuit 21 responds to the supplied control signals by changing a pulse frequency, a pulse generation timing or a pulse duty cycle to control the speeds of rotation of the pulse motors 1a, 1b. The motions of the industrial robot 1 are thus controlled to match the conditions of the workpiece to be transferred.

The speed pattern A is used to transfer a small workpiece at a high speed and to effect operations which are not adversely affected by abrupt changes in speed. The speed pattern B is selected when operations which can tolerate small speed changes are to be performed. Use of the speed pattern C is dictated when a workpiece is to be clamped with a smaller chuck force, or when a heavy workpiece or a mass of liquid is to be transferred while undergoing no abrupt speed changes.

Speed and acceleration problems are usually most troublesome when the workpiece is supplied on the forward stroke of the arm of the robot. For simple reciprocating movements, the speed patterns on forward and rearward strokes may not necessarily desirably be similar to each other. For instances, it is sometimes preferable from the standpoint of efficiency to employ a speed pattern A having a faster speed on the rearward stroke then on the forward stroke. For such an operation, a workpiece weight sensor is provided as a changeover signal generator 16 on the robot arm. With such an arrangement, since the weight of the robot arm is reduced on the rearward stroke after the workpiece has been released by the robot when a signal is received from the changeover signal generator 16 indicative of such a weight reduction, the speed pattern A can be selected.

Such speed changeovers for reciprocating movements can be carried out by the operating program. As shown in FIG. 1, the data of an operating program is delivered (as indicated by a broken line) from the selector circuit 11 to the changeover circuit 15. On the forward stroke, the changeover circuit 15 is supplied with a changeover signal by a manual changeover switch of the changeover signal generator 16. On the rearward stroke, however, input of such a changeover signal is inhibited or invalidated. During periods when there is no changeover signal, the changeover circuit 15 continues to supply the control circuit 19 with the data of the speed pattern A from the speed pattern memory 14. Thereafter, when the changeover signal is received, a desired speed pattern, such as the speed pattern C, is selected and delivered to the control circuit 19 on the forward stroke. Since no changeover signal is effective for the changeover circuit 15 on the rearward stroke, the control circuit 19 drives the motor drive circuit 21 using the speed pattern A.

The speed patterns or curves are not limited to the illustrated three types. Also, the speed curves may be asymmetrical with different speed increase and decrease rates dependent on characteristics of the workpiece to be handled. The industrial robot 1 to which the present invention is applicable may be of the polar-coordinate or Cartesian-coordinate type. Also, the drive device for the industrial robot 1 is not limited to pulse motors.

With the arrangement of the present invention, speed characteristics of an industrial robot while in motion are selectively changed according to conditions of a workpiece so that all movements of the robot are carried out at ideal speeds. Since a plurality of desired speed patterns are stored independently of the operating programs, the speed patterns can be selected independently of and are shared by the operating programs so that no conventionally required operating program changes are necessary. The manual changeover switch employed as the changeover signal generator can be used to take into consideration speed-limiting factors other than the weight of the workpiece. The workpiece weight sensor as the changeover signal generator means can automatically provide a speed setting proportional to the workpiece weight.

What is claimed is:

1. An operation control apparatus for an industrial robot, comprising: an operating program memory; a speed pattern memory for storing a plurality of speed patterns; changeover signal generator means for generating a changeover signal in response to one of a sensed predetermined operating parameter of said industrial robot or operation of a manual switch; changeover circuit means for selecting a speed pattern in response to said changeover signal; and robot drive control unit means for instructing movements of said industrial robot in accordance with a selected operating program read out from said program memory and a speed pattern supplied from said speed pattern memory.

2. The operation control apparatus according to claim 1, wherein said changeover signal generator means comprises a manual changeover switch.

3. The operation control apparatus according to claim 1, wherein said changeover signal generator means comprises a workpiece weight sensor for producing a signal which is used as said changeover signal.

4. The operation control apparatus according to claim 1, wherein one or more of said speed patterns stored in said speed pattern memory are asymmetrical.

5. The operation control apparatus according to claim 4, wherein a slope of one or more of said speed patterns stored in said speed pattern memory are steeper for movement away from a workpiece than for movement toward said workpiece.

* * * * *